United States Patent
Hirota

(10) Patent No.: US 10,718,868 B2
(45) Date of Patent: Jul. 21, 2020

(54) IMAGE PROCESSING DEVICE, METHOD, AND PROGRAM

(71) Applicant: Tamagawa Academy & University, Tokyo (JP)

(72) Inventor: Osamu Hirota, Tokyo (JP)

(73) Assignee: Tamagawa Academy & University, Tokyo (JP)

( * ) Notice: Subject to any disclaimer, the term of this patent is extended or adjusted under 35 U.S.C. 154(b) by 0 days.

(21) Appl. No.: 16/632,839

(22) PCT Filed: Feb. 23, 2018

(86) PCT No.: PCT/JP2018/006808
§ 371 (c)(1),
(2) Date: Jan. 21, 2020

(87) PCT Pub. No.: WO2019/016994
PCT Pub. Date: Jan. 24, 2019

(65) Prior Publication Data
US 2020/0150276 A1    May 14, 2020

(30) Foreign Application Priority Data

Jul. 21, 2017  (JP) .................................. 2017-142209
Oct. 19, 2017  (WO) ................... PCT/JP2017/037843

(51) Int. Cl.
*G01S 17/00*   (2020.01)
*G01S 17/931*   (2020.01)
(Continued)

(52) U.S. Cl.
CPC .......... *G01S 17/931* (2020.01); *G01S 7/4861* (2013.01); *G01S 17/10* (2013.01); *G05D 1/024* (2013.01)

(58) Field of Classification Search
USPC ........................................................ 356/4.01
See application file for complete search history.

(56) References Cited

U.S. PATENT DOCUMENTS 5,305,759 A     4/1994  Kaneko et al.
5,835,199 A *  11/1998  Phillips ................. G01S 7/4802
                                                          356/5.03
(Continued)

FOREIGN PATENT DOCUMENTS

JP         3162070 B2    4/2001
JP       2007-233764 A    9/2007
JP       2008-002908 A    1/2008

OTHER PUBLICATIONS

Notice of Reasons for Rejection issued to JP Application No. 2018-529188, dated Jul. 3, 2018.
(Continued)

Primary Examiner — James R Hulka
(74) Attorney, Agent, or Firm — Studebaker & Brackett PC

(57) ABSTRACT

The purpose of the present invention is to achieve highly accurate detection of obstacles even in adverse weather environments, particularly environments in which a scatter phenomenon caused by fog or the like occurs. A target signal processing unit 51 calculates a cross-correlation function between split reference light from a light source unit 201, and reflected light from a target T, said reflected light being obtained using split signal light from the light source unit 201. An estimation unit 52 estimates scattering characteristics of propagation paths of the signal light and the reflected light. A correction processing unit 53 executes, on the basis of the scattering characteristics estimated by the estimation unit 52, prescribed correction processing of the cross-correlation function calculated by the target signal processing unit 51.

6 Claims, 7 Drawing Sheets

(51) Int. Cl.
*G01S 7/4861* (2020.01)
*G05D 1/02* (2020.01)
*G01S 17/10* (2020.01)

(56) References Cited

U.S. PATENT DOCUMENTS

| | | | | |
|---|---|---|---|---|
| 7,903,021 | B2* | 3/2011 | Aso | G01S 13/931 |
| | | | | 342/70 |
| 8,184,044 | B1* | 5/2012 | Capron | G01S 13/89 |
| | | | | 342/175 |
| 8,242,428 | B2* | 8/2012 | Meyers | G01S 17/36 |
| | | | | 250/203.6 |
| 8,269,978 | B2* | 9/2012 | Capron | G01S 17/89 |
| | | | | 356/484 |
| 8,948,539 | B2* | 2/2015 | Meyers | G06T 5/50 |
| | | | | 250/208.1 |
| 9,134,422 | B2* | 9/2015 | Hunt | G01S 7/4861 |
| 10,176,562 | B2* | 1/2019 | Gill | G02B 5/18 |
| 2008/0266168 | A1 | 10/2008 | Aso et al. | |
| 2010/0258708 | A1* | 10/2010 | Meyers | G01S 17/36 |
| | | | | 250/208.1 |
| 2014/0029850 | A1 | 1/2014 | Meyers et al. | |
| 2017/0084046 | A1* | 3/2017 | Gill | G02B 5/18 |

OTHER PUBLICATIONS

Notice of Decision to Grant a Patent issued to JP Application No. 2018-529188, dated Sep. 18, 2018.
J.H.Shapiro and R.W.Boyd, The physics of ghost imaging, Quantum Information Processing, vol. 11, Issue 4, pp. 949-993, (2012).
Gong, W. et al., "Ghost imaging in scattering media", arXiv [online], Dec. 14, 2008 [retrieved on Dec. 5, 2017], 10 pages, Internet <URL: https://arxiv.org/pdf/0806.3543.pdf> <arXiv:0806.3543v2 [physics. potics]> pp. 2-3, fig.2.
Meyers, R. E. et al., "Virtual ghost imaging through turbulence and obscurants using Bessel beam illumination", Applied Physics Letters [online], vol. 100, Feb. 10, 2012 [retrieved on? Dec. 5, 2017], Article 061126, 4 pages, Internet <URL: https//doi.org/10.1063/1.3684613> <DOI:10.1063/1.3684613> fig.8.
Hirota, Osamu et al. Quantum & Classical Radar Camera, and Effect of Fog for Self Driving Car, The 40th Symposium on Information Theory and Its Applications (SITA2017).
Bina, M. et al., "Backscattering Differential Ghost Imaging in Turbid Media", Physical Review Letters, vol. 110, Feb. 22, 2013, Article 083901, 5 pages, fig. 1, p. 3.
International Search Report issued in PCT/JP2018/006808; dated Apr. 3, 2018.
Ishimaru, Akira, "Wave Propagation and Scattering in Random Media", IEEE Press, (1997), pp. 321-337.

* cited by examiner

IMAGE PROCESSING DEVICE, METHOD, AND PROGRAM

TECHNICAL FIELD

The present invention relates to image processing device and method, and a program.

BACKGROUND ART

Currently, "automatic driving" of passenger cars and the like has attracted social attention as a new technology (for example, refer to Patent Document 1). It is necessary to detect obstacles for putting the "automatic driving" into practical use.

Patent Document 1: Japanese Unexamined Patent Application, Publication No. 2007-233764

DISCLOSURE OF THE INVENTION

Problems to be Solved by the Invention

However, in the related art including Patent Document 1, in detection of obstacles in adverse weather environments, particularly, environments in which a scattering phenomenon caused by fog or the like occurs, it is difficult to secure accuracy required for realization of the "automatic driving".

The invention has been made in consideration of such circumstances, and an object thereof is to realize highly accurate detection of obstacles even in adverse weather environments, particularly, environments in which a scattering phenomenon caused by fog or the like occurs.

Means for Solving the Problems

To accomplish the object, according to an aspect of the invention, there is provided an image processing device including:
a correlation function calculation unit that calculates a cross-correlation function between reflected light from a target by signal light divided from a light source, and reference light that is divided from the light source;
a propagation path characteristic estimation unit that estimates scattering characteristics of propagation paths of the signal light and the reflected light; and
a correction unit that executes predetermined correction processing with respect to the cross-correlation function calculated by the correlation function calculation unit on the basis of the scattering characteristics estimated by the propagation path characteristic estimation unit.

Effects of the Invention

According to the invention, it is possible to realize highly accurate detection of obstacles even in adverse weather environments, particularly, environments in which a scattering phenomenon caused by fog or the like occurs.

PREFERRED MODE FOR CARRYING OUT THE INVENTION

Figure 1:
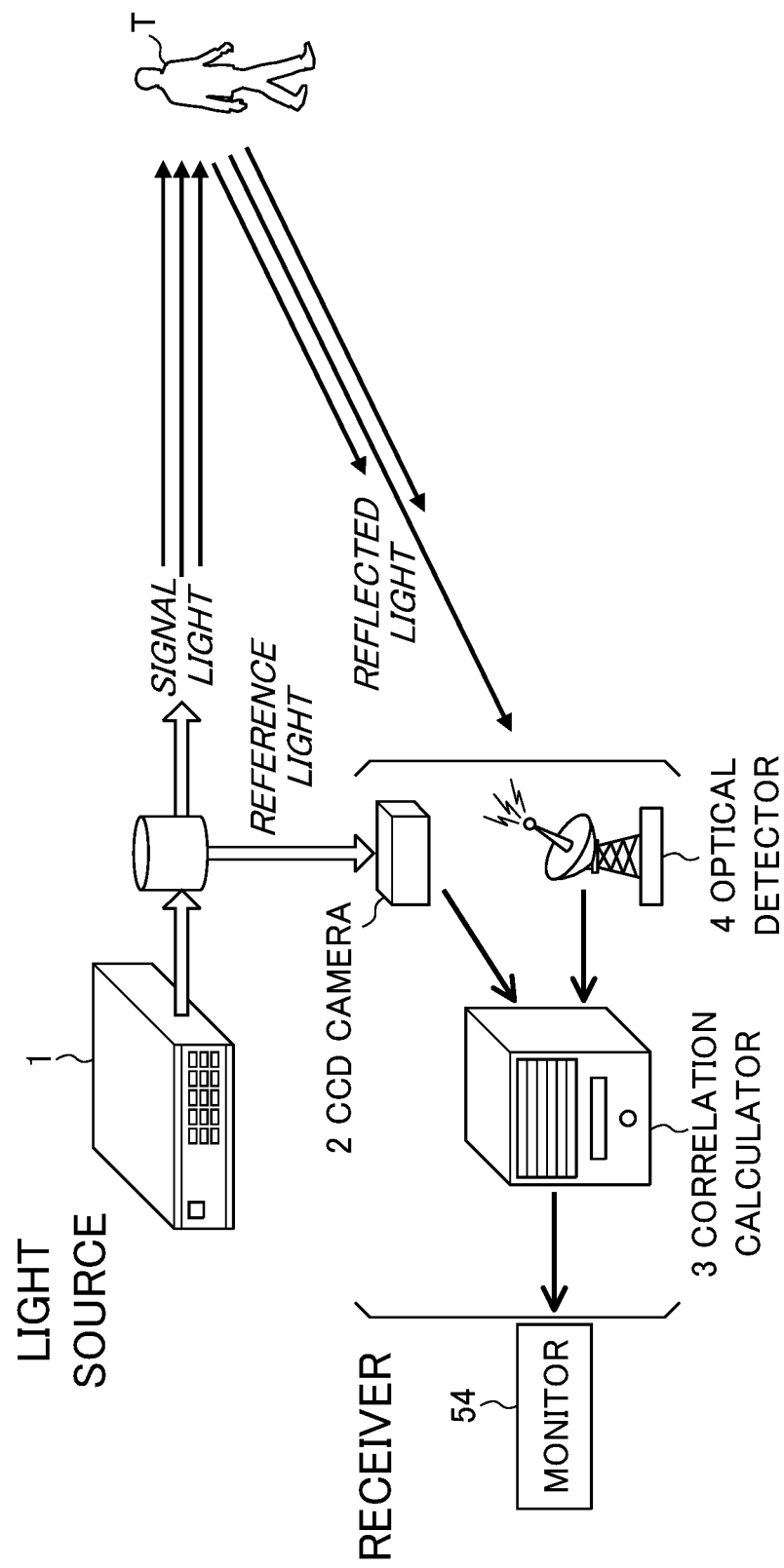
FIG. 1 is a diagram illustrating an overview of a basic image processing technology employed in embodiments of the invention.

Description will be given of image processing using ghost imaging that is a basic technology of the invention before description of embodiments of the invention for easy understanding of the embodiments of the invention.

As a method of detecting obstacles in "automatic driving" of passenger cars and the like, when using a method using existing image processing with a camera, a radar, or the like, it is difficult to form a clear image of an obstacle that is several hundred meters away in consideration of all weather conditions. That is, even when employing the method, it is difficult to realize "automatic driving" of the passenger cars and the like.

Here, ghost imaging that is a technology having resistance to a gradual turbulent flow effect of the atmosphere is employed in the embodiments of the invention. The ghost imaging is a technology of acquiring an image of a target (obstacle) by dividing light from a light source into two light beams and calculating a cross-correlation function between a light that is emitted to the target and a light beam (hereinafter referred to as "reference light") that is used as a reference without being emitted to the target.

For example, in 2012, J. H. Shapiro and R. W. Boyd have established a unified theory with respect to a technology of using various kinds of ghost imaging. According to this, a quantitative evaluation of the turbulent flow effect on the technology becomes possible. As a result, typically, the technology has been proved to have characteristics resistant to a mild turbulent flow of the atmosphere. In this regards, the following Non-Patent Document 1 may be referred to.
[Non-Patent Document 1] J. H. Shapiro and R. W. Boyd, "The physics of ghost imaging," Quantum Information Processing, vol-11, Issue 4. pp 949-933, (2012).

However, the above-described technology originates from a situation in which ghost imaging due to a quantum correlation phenomenon is confirmed in an imaging research using quantum correlation light (quantum-entangled light) in 1995. The ghost imaging is a kind of a technology that enables a two-dimensional image of a target from a single pixel to be reproduced even when reflected light from the target is detected by a single pixel detector.

In the ghost imaging, the light from the light source is divided into two light beams, but the two light beams have a correlation. That is, among the two divided light beams, a light beam that propagates toward the target is referred to as "signal light". The other light beam does not propagate toward the target, and is referred to as "reference light" as described above. The signal light is reflected from the target and becomes reflected light, and is detected by the single pixel detector. The reference light does not propagate toward the target, and is emitted to a charge coupled device (CCD) element that is located at a location having no relation with the target.

A two-dimensional reflection coefficient shape of the target becomes image information of the target, and thus a mechanism that reproduces the image information is required. Accordingly, a two-dimensional cross-correlation function between a signal current of the reflected light that is collectively received by the single pixel detector, and a two-dimensional output current of the reference light received by the CCD element is calculated. A two-dimensional shape of the cross-correlation function matches the two-dimensional reflection coefficient shape, and thus the image information of the target is reproduced.

As described above, the ghost imaging is one of epoch-making technologies capable of reproducing the image information even when light carrying two-dimensional information is received by the single pixel light receiver (detector) having no spatial resolution capability.

In addition, hereinafter, an overview of an image processing technology (hereinafter, simply referred to as "basic image processing technology") using the ghost imaging that is the basic technology of the embodiments of the invention will be briefly described with reference to FIG. 1.

As illustrated in FIG. 1, for example, a light source L and a receiver R, a monitor, and the like are provided to realize the basic image processing technology. The light source L transmits quantum-entangled light or pseudo-thermal light. The receiver R receives reflected light from a target T with respect to signal light from the light source L. For example, in an example in FIG. 1, the receiver R includes a CCD camera K, a single pixel optical detector S, and a correlation calculator C. In the receiver R, the single pixel optical detector S collectively receives energy of the reflected light. The correlation calculator C calculates a cross-correlation function between an output of the single pixel optical detector S and a two-dimensional output of the CCD camera K of the reference light. According to this, the cross-correlation function appears as an image of a subject.

In the basic image processing technology, an image of the target T matches the shape of the two-dimensional cross-correlation function output from the correlation calculator C, and thus how to accurately estimate the cross-correlation function is a technical problem.

On the other hand, in the basic image processing technology, an optical signal (the reflected light) that carries image information of the target T is received by the single pixel optical detector S, and thus there are characteristics in which when the optical signal is subjected to disturbance of a two-dimensional space, the influence is suppressed to a certain extent.

In contrast, in a method (not illustrated in the drawing) in which an optical signal that carries two-dimensional image information of the target T is directly acquired as two-dimensional information by a stereo camera, it is necessary to accurately receive a two-dimensional optical signal that carries the image information of the target T. Accordingly, when disturbance exists in the reflected light, the disturbance directly becomes a deterioration cause in reproduction of the image of the target T.

As described above, it can be understood that the basic image processing technology by the ghost imaging is less susceptible to the influence of disturbance in a light propagation path (the light source L and the target T). However, the technology is useful under a gentle atmospheric turbulent flow, but the technology is not necessarily useful in a scattering phenomenon caused by fog or the like. As described above, even when using the image processing technology by the ghost imaging, there is a big problem to be solved to appropriately acquire image information of the target T that becomes a subject under various weather environments.

For example, as an image processing technology that does not use the ghost imaging, there is an image information acquisition technology by a CCD camera or the like. However, in the technology, great image quality deterioration is caused by disturbance in the light propagation path. A technology of correcting the deterioration is an image processing technology, and various correction technologies have been developed.

However, for example, scattering or a turbulent flow of the light propagation path which occurs under an environment of an automobile is in a dynamic state having two-dimensional unevenness, and thus under the environment, even when using a correction technology in the related art with respect to image information acquired by the CCD camera, it is difficult to expect an improvement of image quality deterioration. Specifically, with regard to disturbance or scattering in the light propagation path, a static turbulent flow theory (for example, refer to Non-Patent Document 2) or a general theory that expands the static scattering theory to a dynamic scattering theory (for example, refer to Non-Patent Document 3) is constructed. For example, when the static turbulent flow theory of Non-Patent Document 2 is generalized as a dynamic theory, it is estimated that an improvement of deterioration of image quality is not expected even by correction. That is, under the above-described environment, a propagation path model as a premise randomly varies, and thus it is difficult to appropriately perform correction with respect to the image information obtained by the CCD camera.

[Non-Patent Document 2] A. Ishimaru, "Wave propergation and scattering in random media", IEEE Press, (1997).

[Non-Patent Document 3] Osamu Hirota, Masaki Sohma, "Quantum & Classical Radar Camera, and Effect of Fog for Self Driving Car", The 40th Symposium on Information Theory and its Applications, 2017.

On the other hand, a correlation function image sensor (correlation calculator C) using the ghost imaging is resistant to an atmospheric turbulent flow effect (continuous fluctuation in a refractive index) in the light propagation path, and thus it is not necessary to perform correction with respect to such a gentle disturbance. However, in a case where a scattering phenomenon caused by fog or rain occurs, occurrence of image quality deterioration as in a typical CCD camera is proved by the dynamic theory. Accordingly, in the case of using the correlation function image sensor as the image processing device, it is necessary to perform appropriate correction for preventing image quality deterioration due to a scattering phenomenon.

As described above, in the case of using the CCD camera as the image processing device, there is a problem that the image processing device is weak against the influence of the atmospheric disturbance. On the other hand, in the case of using the correlation function image sensor as the image processing device, there is a problem that the image processing device is strong against the influence of the atmospheric disturbance, but it is difficult to cope with the scattering phenomenon.

An image processing device capable of solving the problems is an image processing device to which the invention is applied. That is, the image processing device to which the invention is applied is capable of preventing image quality deterioration caused by an influence of the scattering phenomenon even in a case where the scattering phenomenon occurs in the light propagation path due to fog, rain, or the like, and is capable of acquiring an appropriate image. Specifically, for example, the image processing device to which the invention is applied has a correlation function calculation function, a propagation path characteristic estimation function, and a correction function. The correlation function calculation function is a function of calculating a cross-correlation function between reflected light from a target by signal light divided from a light source, and reference light that is divided from the light source. The propagation path characteristic estimation function is a function of estimating scattering characteristics of propagation paths of the signal light and the reflected light. The correction function is a function of executing predetermined correction processing with respect to the cross-correlation function calculated by the correlation function calculation function on the basis of the scattering characteristics estimated by the propagation path characteristic estimation function. Hereinafter, two embodiments of the image processing device to which the present invention is applied will be individually described in the order of a first embodiment and a second embodiment. That is, as the image processing device to which the present invention is applied, an image processing device 11a (FIG. 2 and the like) will be described in the first embodiment, and an image processing device 11b (FIG. 7) will be described in the second embodiment.

First Embodiment

Figure 2:
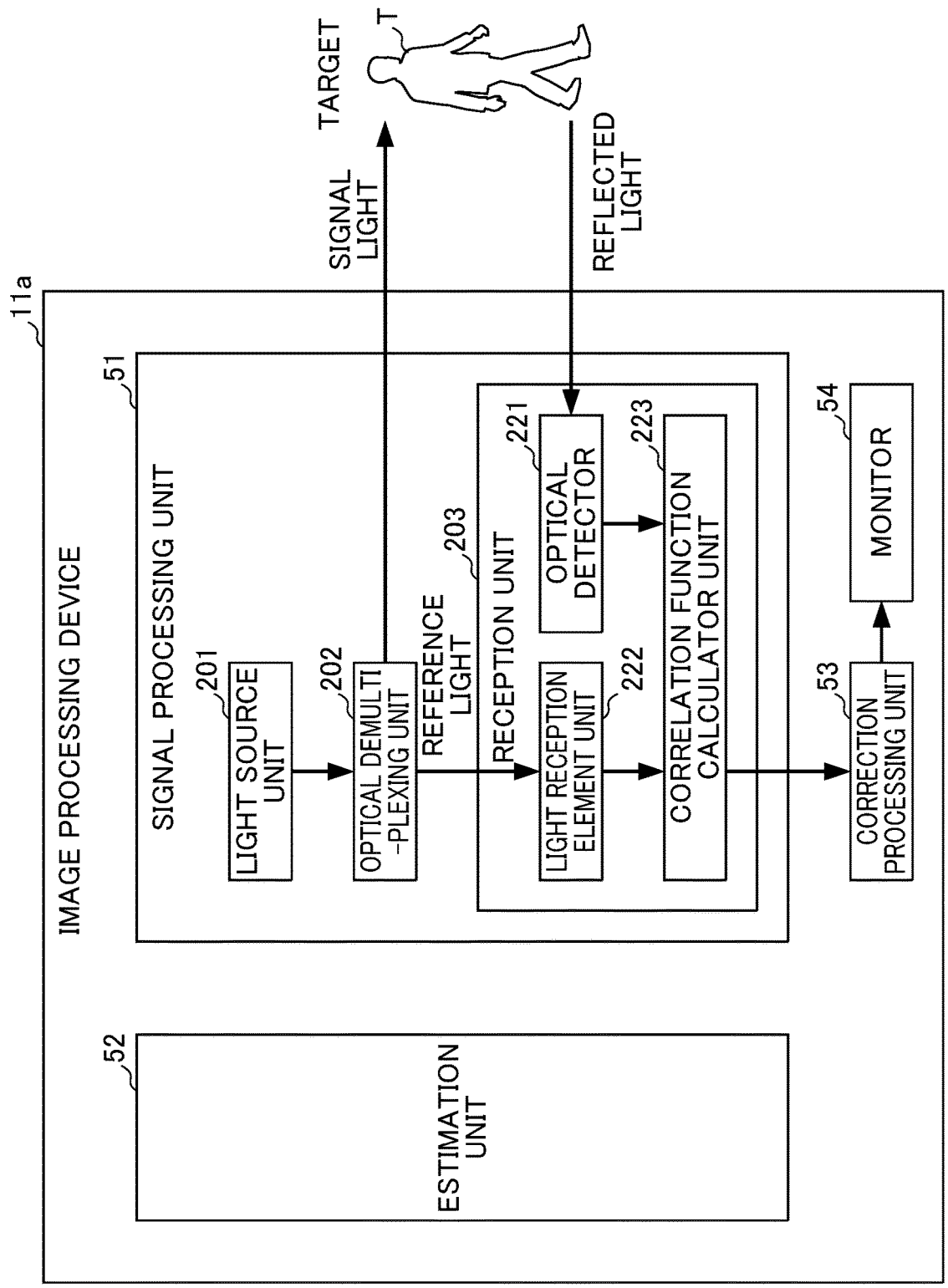
FIG. 2 is a block diagram illustrating an example of a configuration of an image processing device according to a first embodiment of the invention.

Hereinafter, the first embodiment of the invention will be described with reference to the accompanying drawings. FIG. 2 is a block diagram illustrating an example of a configuration of the image processing device 11a according to the first embodiment of the invention. As illustrated in FIG. 2, the image processing device 11a includes a target signal processing unit 51, an estimation unit 52, a correction processing unit 53, and a monitor 54.

The target signal processing unit 51 functions as a correlation function image sensor that uses a ghost imaging phenomenon, and includes a light source unit 201, an optical demultiplexing unit 202, and a reception unit 203. The reception unit 203 includes a light detection unit 221, a light reception element unit 222, and a correlation function calculation unit 223.

For example, the light source unit 201 generates and emits pseudo-thermal light. For example, the optical demultiplexing unit 202 is configured as a half mirror, divides the pseudo-thermal light emitted from the light source unit 201 into two parts, and outputs the divided parts. One of the two light beams divided and output by the optical demultiplexing unit 202 is signal light that is emitted toward the target T, and the other light beam is reference light. The signal light and the reference light which are obtained through division into two parts from the light source unit 201 that is a pseudo-thermal light source have a correlation of a fluctuation of classical light (pseudo-thermal light).

The signal light is reflected from the target T as reflected light after being emitted toward the target T, and total energy of the reflected light is collectively detected by the light detection unit 221. For example, the light detection unit 221 is configured as the single pixel optical detector.

The reference light is received by the light reception element unit 222. For example, the light reception element unit 222 is configured as the CCD element.

The correlation function calculation unit 223 calculates a cross-correlation function between the total energy of the reflected light which is detected by the light detection unit 221, and the reference light that is received by the light reception element unit 222, and outputs the cross-correlation function to the correction processing unit 53.

The estimation unit 52 estimates scattering characteristics of a propagation path, and outputs the scattering characteristics to the correction processing unit 53. Here, for example, the scattering characteristics of the propagation path represent a transfer function that represents deterioration in image production under an environment in which the scattering phenomenon such as fog occurs. That is, in the image processing technology using the ghost imaging, the cross-correlation function that becomes an image output is averaged by the transfer function, and thus distortion occurs in a final image. When an accurate shape of the transfer function relating to the deterioration of the image is known, for example, appropriate correction can be performed by inverse function processing such as a Wiener filter.

Here, an existing image processing technology and a correction technology that is executed by the correction processing unit 53 will be briefly described. In the existing image processing technology, it is assumed that a transfer function relating to image deterioration is known, and does not vary in an image expression space. In addition, it is required for the transfer function to be spatially uniform. In contrast, as an auxiliary function, the present inventors newly apply a mechanism for estimating the scattering characteristics of the propagation path from the space-time dependent generalized scattering transfer function for every frame to realize appropriate acquisition of an image of a target even in an environment such as dynamic fog in which the transfer function randomly varies in dependence on space-time. Here, the space-time dependent generalized scattering transfer function is a mathematical formula when uniformly modeling a scattering effect by the atmospheric turbulent flow and the dynamic fog with respect to the signal light and the reflected light as an input/output communication channel model of a propagation path as illustrated in Expression 25 in Non-Patent Document 3. In a theory of the related art, the scattering phenomenon is discrete, and thus it is difficult to apply a mathematical system of a continuum such as an atmospheric turbulent flow. However, the scattering phenomenon is derived as a result of theoretical integration of the atmospheric turbulent flow and the scattering phenomenon on the basis of a theory of a continuous system due to finding of smoothing phenomenon of a dielectric constant by an external force with respect to a scattering medium.

Detailed description is as follows. A theory of an effect of fog on light so far analyzes an effect of multiple scattering by a group of micro-particles which are randomly placed in space. In an environment of a mobile body such as an automobile, new disturbance caused by a macro and random external force is applied to the group of micro-particles. Due to the effect of the external force, collective motion of the micro-particles occurs, an equivalent dielectric constant of the group of particles varies, and a smoothing phenomenon that can be regarded as a continuous system from a discrete system occurs. When equivalently introducing the mathematical principle of the phenomenon to the mathematical system of the continuous system of the atmospheric turbulent flow, it is possible to uniformly express disturbance characteristics of light due to the atmospheric turbulent flow and the scattering phenomenon such as fog. As a result, it is possible to obtain a formula of a transfer function of light by using the equivalent dielectric constant of dynamic fog in the form of TATARSKI theory with respect to a continuous variation of the dielectric constant due to the atmospheric turbulent flow.

According to this, in the case of scattering with constant and uniform disturbance, an actual transfer function can be described in a form in which the equivalent dielectric constant is substituted for the transfer function formula based on a point spread function obtained from a scattering theory in the related art. On the other hand, in the case of abnormal and non-uniform external force, the transfer function can be treated as space-time randomness of an input (starting point) of the point spread function in the above-described form. When understanding properties of the generalized scattering transfer function, an equivalent mutual coherence length that gives information such as image distortion in the ghost imaging is derived. When the parameter (equivalent mutual coherence length) is determined, a correlation function type point spread function in imaging by the correlation function is determined, and thus the distortion can be corrected in the process of correlation function calculation processing of the ghost imaging. On the other hand, when only parameters such as dispersion of equivalent dielectric constant fluctuation of a light propagation path or information of a particle number density fluctuation of scattered bodies are obtained by the scattering characteristic estimation unit 102, the correction processing unit performs correction processing to estimate the mutual coherence length from the theory.

The theory of the space-time dependent generalized scattering transfer function in the invention is obtained through application of the above-described configurations. As a result of the present theory, a theoretical formula of the space-time dependent generalized scattering transfer function is obtained. In addition, the theoretical formula derived in the present theory is referred to as a theoretical formula in the same theory.

Here, the correction processing unit 53 corrects the cross-correlation function calculated by the correlation function calculation unit 223 on the basis of space-time dependent scattering characteristics of a propagation path which are estimated by the estimation unit 52 by inverse function processing for every frame. This is generalization of a correction technology method that is an existing technology. According to this, deterioration of image data due to a dynamic scattering phenomenon is corrected. Specifically, for example, the correction processing unit 53 corrects a shape of a cross-correlation function corresponding to a first reproduction image obtained for every frame.

The monitor 54 displays an image corresponding to image data corrected by the correction processing unit 53.

Figure 3:
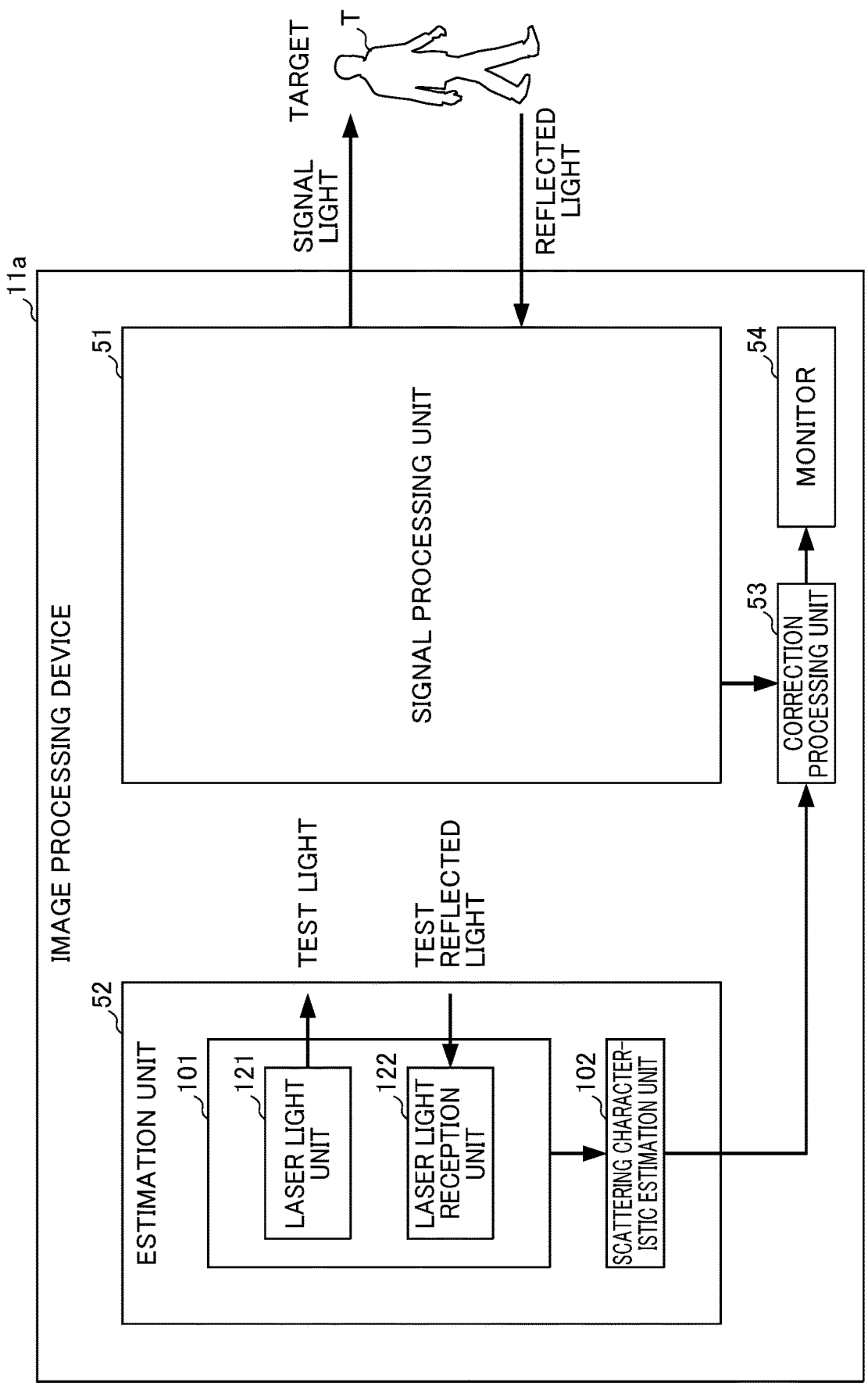
FIG. 3 is a block diagram illustrating an example of a detailed configuration of an estimation unit in the configuration of the image processing device illustrated in FIG. 2.

Next, a detailed configuration of the estimation unit 52 will be described with reference to FIG. 3. FIG. 3 is a block diagram illustrating a detailed configuration example of an estimation unit in the image processing device 11a illustrated in FIG. 2.

In the example illustrated in FIG. 3, the estimation unit 52 includes a propagation path test unit 101 and a scattering characteristic estimation unit 102. The propagation path test unit 101 includes a laser light unit 121 and a laser light reception unit 122.

The laser light unit 121 repetitively emits (transmits) a laser pulse (optical pulse) toward the target T as test light.

The laser light reception unit 122 receives reflected light (test reflected light) from the target T.

The scattering characteristic estimation unit 102 estimates scattering characteristics of a propagation path from the space-time dependent generalized scattering transfer function on the basis of the laser pulse (transmission pulse) as the test light transmitted toward the target T by the laser light unit 121 and the laser pulse (reception pulse) as the test reflected light received by the laser light reception unit 122, and outputs the scattering characteristics to the correction processing unit 53. Details of the space-time dependent generalized scattering transfer function are shown in Expression 25 in Non-Patent Document 3.

Figure 4:
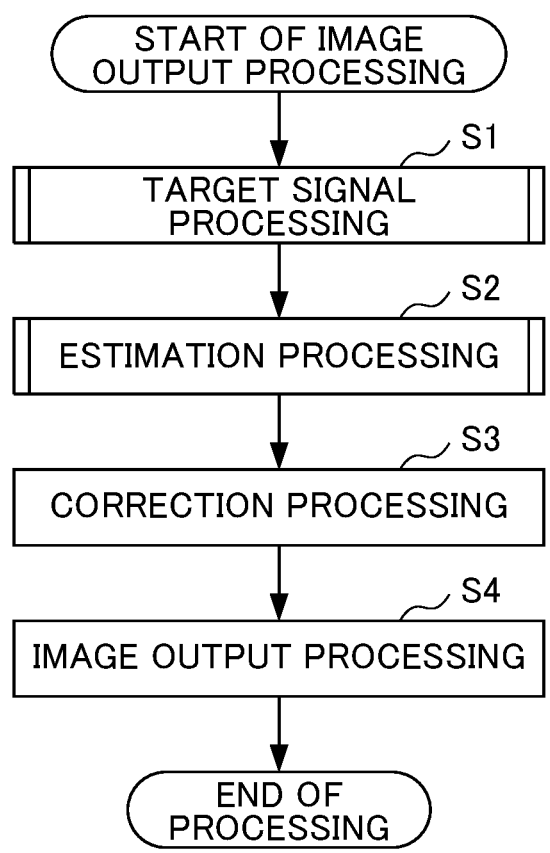
FIG. 4 is a flowchart illustrating an example of a flow of image output processing executed by the image processing device illustrated in FIG. 2.

Hereinafter, a series of processing which is performed by the image processing device 11a having the above-described functional configuration until outputting an image of the target T is referred to as "image output processing". FIG. 4 is a flowchart illustrating an example of a flow of the image output processing that is executed by the image processing device 11a illustrated in FIG. 2.

In step S1, the target signal processing unit 51 calculates a cross-correlation function between the reflected light from the target T by the signal light divided from the light source unit 201, and the reference light that is divided from the light source unit 201. Note that, the processing in step S1 is referred to as "target signal processing". Details of the target signal processing will be described later with reference to FIG. 5.

In step S2, the estimation unit 52 estimates scattering characteristics of propagation paths of the signal light and the reflected light. Note that, hereinafter, the processing in step S2 is referred to as "scattering characteristic estimation processing". Details of the scattering characteristic estimation processing will be described later with reference to FIG. 6.

In step S3, the correction processing unit 53 executes predetermined correction processing with respect to the cross-correlation function that is calculated by the correlation function calculation unit 223 on the basis of the scattering characteristics of the propagation paths which are estimated in the processing in step S2. According to this, deterioration of the image data due to the scattering phenomenon is corrected.

In step S4, the correction processing unit 53 causes the monitor 54 to display an image corresponding to the corrected image data.

Figure 5:
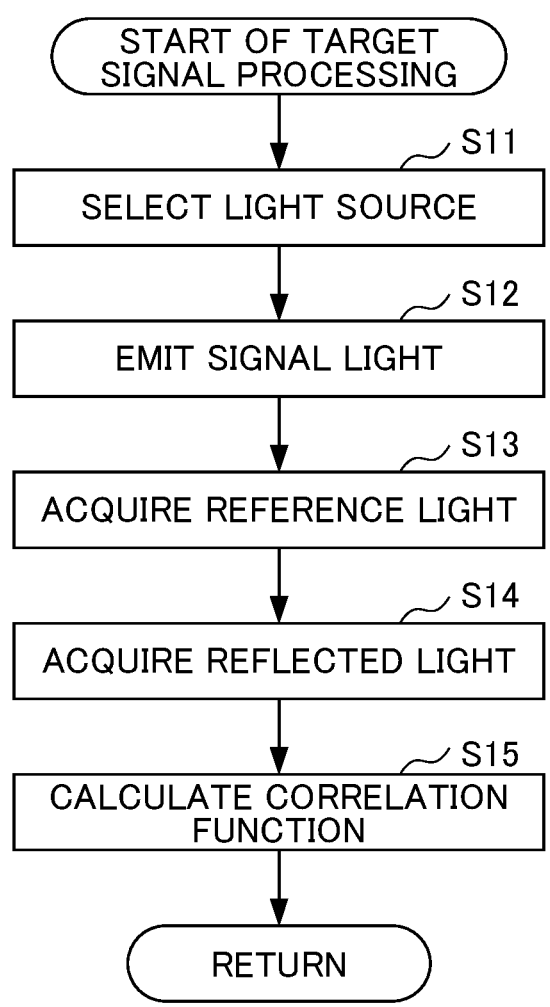
FIG. 5 is a flowchart illustrating an example of a detailed flow of target signal processing in the image output processing illustrated in FIG. 4.

Next, details of the target signal processing in step S1 will be described with reference to FIG. 5. FIG. 5 is a flowchart illustrating an example of a detailed flow of the target signal processing in the image output processing illustrated in FIG. 4.

In step S11, the light source unit 201 generates and emits pseudo-thermal light.

In step S12, the optical demultiplexing unit 202 divides the pseudo-thermal light emitted in step S11 into two parts, and outputs one of the two divided light beams as signal light and outputs the other light beam as the reference light.

In step S13, the light reception element unit 222 receives the reference light that is emitted in step S11 and is divided in step S12.

In step S14, the light detection unit 221 collectively detects the reflected light that is obtained as a result after the signal light that is emitted in step S11 and is divided in step S12 is reflected from the target T.

In step S15, the correlation function calculation unit 223 calculates a cross-correlation function on the basis of a correlation function of the reference light received in step S13, and total energy of the reflected light detected in step S14.

Figure 6:
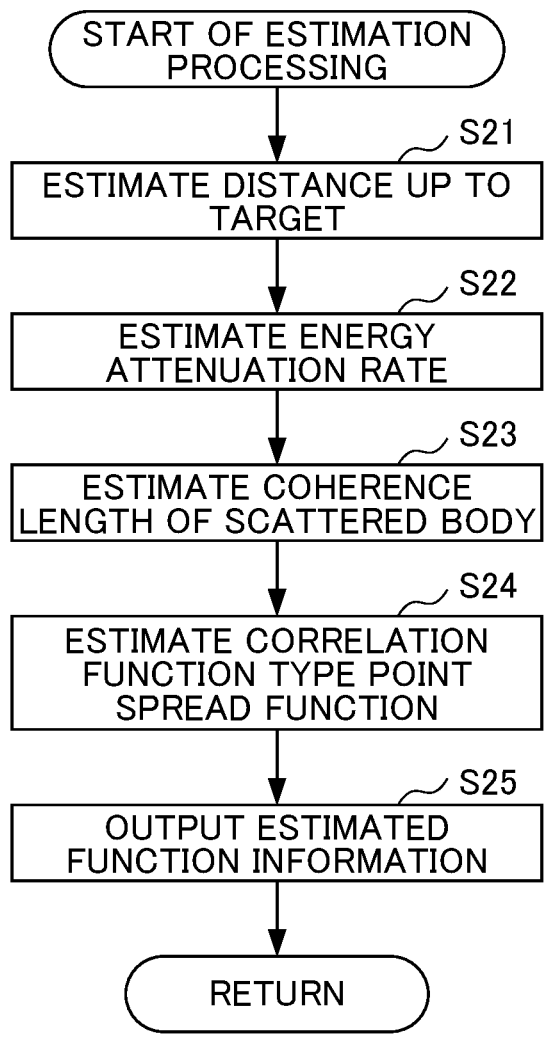
FIG. 6 is a flowchart illustrating an example of a flow of estimation processing in the image output processing illustrated in FIG. 4.

Next, the scattering characteristic estimation processing in step S2 will be described with reference to FIG. 6. FIG.

6 is a flowchart illustrating an example of a detailed flow of the scattering characteristic estimation processing in the image output processing illustrated in FIG. 4.

In step S21, the scattering characteristic estimation unit 102 estimates a distance up to the target T on the basis of a time difference between the transmission pulse (test light) transmitted by the laser light unit 121, and the reception pulse (test reflected light) received by the laser light reception unit 122.

The scattering characteristic estimation unit 102 estimates a scattering energy attenuation rate in reciprocation up to the target T from a difference between energy of the transmission pulse and energy of the reception pulse. That is, the scattering characteristic estimation unit 102 estimates an average scattering attenuation rate in a target planar space which is caused by the scattering phenomenon of the propagation paths.

In step S23, the scattering characteristic estimation unit 102 calculates dispersion of equivalent dielectric fluctuation or particle number density fluctuation of scattered bodies from a theory of a generalized scattering transfer function on the basis of the scattering energy attenuation rate that is estimated, and estimates an equivalent mutual coherence length. Specifically, for example, a memory (not illustrated) of the image processing device 11a stores a conversion formula for calculating the dispersion of the equivalent dielectric constant fluctuation or the particle number density fluctuation of the scattered bodies and estimating the equivalent mutual coherence length from the theory of the generalized scattering transfer function. The scattering characteristic estimation unit 102 estimates the equivalent mutual coherence length on the basis of the conversion formula.

In step S24, the scattering characteristic estimation unit 102 estimates a correlation function type point spread function due to scattering by using a theory of the correlation function type point spread function with respect to an atmospheric turbulent flow in the related art as in Non-Patent Document 1 on the basis of the equivalent mutual coherence length estimated in step S23. Specifically, for example, the memory (not illustrated) of the image processing device 11a stores a conversion formula for estimating the correlation function type point spread function due to scattering by using the theory of the correlation function type point spread function with respect to an atmospheric turbulent flow in the related art. The scattering characteristic estimation unit 102 estimates the correlation function type point spread function due to scattering on the basis of the conversion formula.

In step S25, the scattering characteristic estimation unit 102 outputs information of the correlation function type point spread function estimated in step S24 to the correction processing unit 53 as correction information.

Note that, the correction processing unit 53 performs distortion inverse processing by using the correction information (correlation function type point spread function) output from the scattering characteristic estimation unit 102 to correct the cross-correlation function, and outputs the resultant cross-correction function as a correlation function that is similar to an original shape. Since the correlation function similar to the original shape is output, deterioration of the image data is corrected.

As described above, the image processing device 11a according to the first embodiment includes the estimation unit 52 and the correction processing unit 53. The estimation unit 52 estimates the scattering characteristics (specifically, the correlation function type point spread function due to scattering) in the propagation paths. The correction processing unit 53 corrects deterioration of the image data on the basis of the estimated scattering characteristics. According to this, even in a case where the signal light that propagates toward the target T and the reflected light from the target T are disturbed by randomly strong scattering due to dense fog or the like, it is possible to finally secure very high quality image information (image data) of the target T.

Second Embodiment

In the above-described first embodiment, the reflected light from the target T is acquired as is by the light detection unit 221. However, to appropriately acquire the image data of the target T, it is preferable to acquire the image data after amplification instead of acquiring the reflected light from the target T as is. An embodiment in which the reflected light from the target T is acquired after amplification as described above will be described below as a second embodiment. Even in a case where attenuation of the reflected light is significant, an image processing device 11b according to the second embodiment acquires the reflected light after amplification, and thus the image data of the target T can be appropriately acquired.

Figure 7:
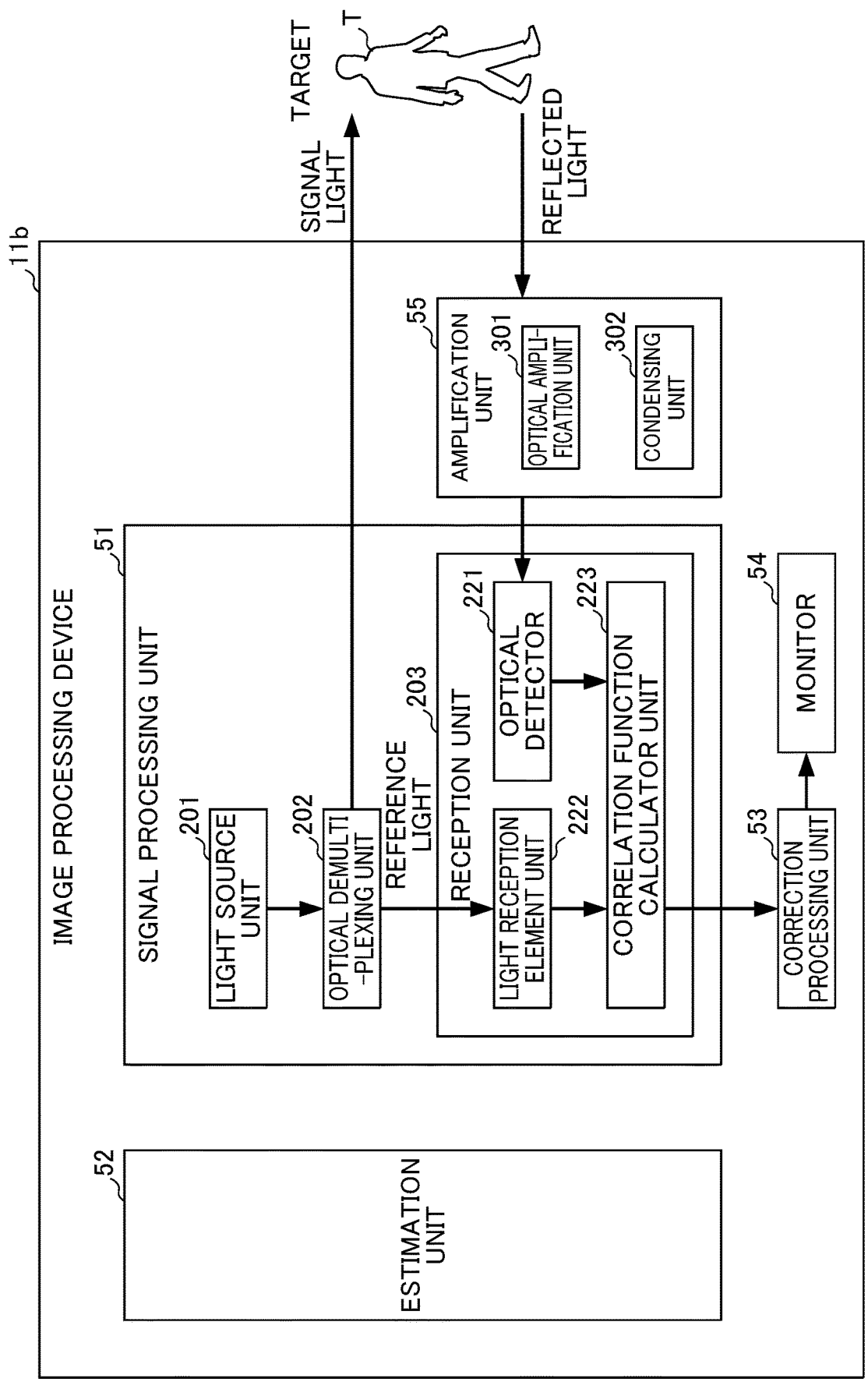
FIG. 7 is a block diagram illustrating an example of a configuration of an image processing device according to a second embodiment.

FIG. 7 is a block diagram illustrating an example of a configuration of the image processing device 11b according to the second embodiment of the invention. The configuration of the image processing device 11b according to the second embodiment is different from the configuration of the image processing device 11a according to the first embodiment in that an amplification unit 55 is provided, and the other constituent elements are common. Here, in the second embodiment, the same reference numeral will be given to a configuration that is common to the first embodiment, and description thereof will be omitted.

As illustrated in FIG. 7, the image processing device 11b according to the second embodiment includes the amplification unit 55 in addition to the target signal processing unit 51, the estimation unit 52, the correction processing unit 53, and the monitor 54 as in the first embodiment. The amplification unit 55 includes a condensing unit 301 and an optical amplification unit 302.

The condensing unit 301 two-dimensionally condenses the reflected light that is reflected from the target T. The optical amplification unit 302 one-dimensionally amplifies the reflected light that is condensed. That is, the light detection unit 221 includes the condensing unit 301 and the optical amplification unit 302, and thus the light detection unit 221 can detect the reflected light after amplification.

As described above, the image processing device 11b according to the second embodiment includes the optical amplification unit 302. As a result, even in a case where energy attenuation of the reflected light is large when the scattering phenomenon such as fog is very strong, the reflected light can be appropriately detected.

Note that, a typical optical amplification unit cannot be used when the typical optical amplification unit is a light detection unit that receives two-dimensional information, but the image processing device 11b according to this embodiment can employ one-dimensional single pixel optical detector as the light detection unit 221. Accordingly, even when two-dimensional light is collectively and one-dimensionally amplified by the optical amplification unit 302 before the light detection unit 221 receives the reflected light from the target T, an influence on image information hardly occurs. Accordingly, in a case where the reflected light is weak, it is possible to prevent image deterioration caused by weakness of light by using the optical amplification unit 302.

As described above, the image processing device 11$a$ according to the first embodiment and the image processing device 11$b$ according to the second embodiment include the estimation unit 52 as an auxiliary unit of the correlation function image sensor (target signal processing unit 51). According to this, correction based on the estimated scattering characteristics can be made, and thus even under an environment in which the scattering phenomenon occurs, it is possible to appropriately acquire an image of a target.

Hereinbefore, description has been given of the first embodiment and the second embodiment as an embodiment of the invention, but the invention is not limited to the above-described embodiments, and it should be understood that variations, modifications, and the like in a scope capable of accomplishing the object of the invention are included in the invention.

For example, in the first embodiment or the second embodiment, the estimation unit 52 has the configuration illustrated in FIG. 3, but there is no particular limitation thereto. That is, as a method of estimating the scattering characteristics by the estimation unit 52, the first embodiment and the second embodiment employ a method of estimating the scattering characteristics of the propagation paths on the basis of the transmission pulse that is actually transmitted to the target T, and the reception pulse that is actually reflected from the target T. However, the method of estimating the scattering characteristics is not particularly limited to the above-described method. For example, the image processing device 11$a$ and the image processing device 11$b$ may acquire big data obtained by storing various pieces of data relating to the scattering characteristics of the propagation paths such as an average degree of scattering attenuation of the propagation paths due to scattering or a turbulent flow of the propagation paths and an average size of scattered bodies in advance, and may extract an appropriate scattering model by using the big data to estimate the scattering characteristics. More specifically, for example, the estimation unit 52 may extract the scattering model from the big data by artificial intelligence or the like with reference to a part of outputs from the target signal processing unit 51, may calculate correction information by instantaneously calculating the correlation function type point spread function based on the theoretical formula of the dynamic theory of scattering (for example, the theory of the above-described space-time dependent generalized scattering transfer function), and may provide the correction information to the correction processing unit 53. Note that, the above-described big data may be stored in a removable medium or a server computer capable of being connected through a network without limitation to the memory in the image processing device 11$a$ and the image processing device 11$b$.

In addition, in the image processing device 11$a$ and the image processing device 11$b$ according to the first embodiment and the second embodiment, it is assumed that the light source unit 201 is the pseudo-thermal light source that generates pseudo-thermal light, but the light source unit 201 may be a quantum light source having a quantum-mechanical entangling effect or a light source that passes through an artificial variable random pattern. Even when using other light sources as described above, signal light and reference light which are divided into two parts from the light source may have correlation.

In addition, it is preferable that the image processing device 11$a$ and the image processing device 11$b$ according to the first embodiment and the second embodiment are mounted in an automobile that performs automatic driving. The reason for this is as follows. In a light propagation path that occurs in an environment of the automobile, scattering or a turbulent flow is in a non-uniform dynamic state and it is required to obtain accurate image data of obstacles in the environment of the automobile that performs automatic driving. However, the image processing device 11$a$ and the image processing device 11$b$ may be used in another usage instead of being mounted in the automobile that performs automatic driving. For example, the image processing devices may be used as a sport broadcasting camera that can obtain a clear image of an operation target even in adverse weather.

Here, a difference between an existing image processing technology (for example, the image processing technology illustrated in FIG. 1) and the image processing device 11$a$ and the image processing device 11$b$ of the invention will be briefly supplemented. First, in the transfer function in the propagation path model of disturbance in the existing technology, it is assumed that spatiotemporal fluctuation does not occur. That is, as a premise, an image processing process model of the related art is based on the assumption that a disturbance source, a transceiver, a target, and the like are in a stationary state, and disturbance of a propagation path is a turbulent flow phenomenon of air in fine weather. Accordingly, as in the automobile, in a case where the transceiver and the target are relatively moving, or in a case where a disturbance source such as a turbulent flow unevenly fluctuates due to wind, there is a problem that the image processing process model of the related art cannot appropriately acquire an image. In addition, there is a problem that it is difficult to appropriately acquire an image in a case where scattering caused by fog, rain, snow, or the like is included in the disturbance of the propagation path. The image processing device 11$a$ and the image processing device 11$b$ of the invention attempt to solve the problem. In addition, typically, a reflection rate of the target (for example, the target T) is very low in a case other than a metal. In addition, in a case where the disturbance source is the scattering phenomenon, propagation energy attenuation is great, and thus there is a problem that signal energy reaching a reception device is very small. Even in this case, in the respective embodiments of the invention (particularly, the second embodiment of the invention), even in a case where energy attenuation is great, it is possible to appropriately acquire an image.

In other words including the above-described points, in first embodiment according to the invention, a correction control technology based on the dynamic scattering theory is introduced to provide a method for adapting the following environments, that is, when obstacles are relatively moving in the case of scattering caused by fog, rain, snow, or the like, or in a case where a disturbance source of a turbulent flow or scattering unevenly fluctuates due to wind. In addition, the first embodiment according to the invention is provided with a countermeasure with respect to weakness of the reflected light from the target (a case where attenuation is great) by using an optical signal strengthening mechanism (for example, the amplification unit 55 in FIG. 7).

For example, in a case where the series of processing in the above-described embodiments is executed by software, a program that constitutes the software is installed in a computer or the like over a network or from a recording medium. The computer may be a computer provided in dedicated hardware. In addition, the computer may be a computer capable of executing various functions by installing various programs, for example, a smart phone, a pc, various devices, or the like other than a server.

In addition, for example, a recording medium including the program may be constituted by a removable medium (not illustrated) that is distributed separately from a device main body to provide a program to a user, a recording medium that is provided to the user in a state of being provided in the device main body in advance, or the like.

Note that, in this specification, it should be understood that steps for describing the program recorded in the recording medium includes not only processes performed in time series according to a procedure but also processes executed in parallel or individually even though the processes are not processed in time series.

In other words, the image processing device to which the invention is applied may employ various embodiments having the following configurations. That is, the image processing device (for example, the image processing device 11a illustrated in FIG. 2) to which the invention is applied may be an image processing device including: a correlation function calculation unit (for example, the correlation function calculation unit 223 illustrated in FIG. 2) that calculates a cross-correlation function between reflected light from a target by signal light divided from a light source, and reference light that is divided from the light source; a propagation path characteristic estimation unit (for example, the estimation unit 52 illustrated in FIG. 2) that estimates scattering characteristics of propagation paths of the signal light and the reflected light; and a correction unit (for example, the correction processing unit 53 illustrated in FIG. 2) that executes predetermined correction processing with respect to the cross-correlation function calculated by the correlation function calculation unit on the basis of the scattering characteristics estimated by the propagation path characteristic estimation unit.

According to this, correction based on data of estimated scattering characteristics is made, and thus it is possible to appropriately acquire an image of a target even under an environment in which a scattering phenomenon occurs.

In addition, the propagation path characteristic estimation unit may include,
a laser light transmission unit (for example, the laser light unit 121 illustrated in FIG. 3) that transmits laser light to the target,
a laser light reception unit (for example, the laser light reception unit 122 illustrated in FIG. 3) that receives laser light reflected from the target, and
a scattering characteristic estimation unit (for example, the scattering characteristic estimation unit 102 illustrated in FIG. 3) that estimates the scattering characteristics on the basis of the laser light transmitted from the laser light transmission unit and the laser light that is received by the laser light reception unit. According to this, the scattering characteristics are estimated on the basis of transmission and reception of the laser light with respect to the target, and correction based on the data is made, and thus it is possible to appropriately acquire an image of the target even under an environment in which a scattering phenomenon occurs.

In addition, the propagation path characteristic estimation unit
may estimate the scattering characteristics by using a predetermined scattering model based on a plurality of pieces of data obtained in advance with respect to the scattering characteristics of the propagation paths.

In addition, the image processing device to which the invention is applied may employ various embodiments having the following configurations. That is, the image processing device to which the invention is applied (for example, the image processing device 11b illustrated in FIG. 7) may further include
an amplification unit (for example, the amplification unit 55 illustrated in FIG. 7) that amplifies the reflected light from the target by the signal light, and
the correlation function calculation unit may calculate a cross-correlation function between the reflected light amplified by the amplification unit and the reference light.

The image processing device of the invention can be used as an image processing device that captures an image of obstacles in automatic driving, and thus acquisition of an image of obstacles on a front side in adverse weather, which is a problem in a sensor technology, becomes possible, and thus the image processing device contributes to a near future industry. In addition, in a case where the light source is set as a pseudo-thermal light source, the cost of manufacturing the apparatus can be reduced, and thus mass production is also possible. In addition, in a case where high performance is required, the requirement leads to development of system that employs a quantum light source, and thus convergence with a wide range of industrial technologies can be expected.

EXPLANATION OF REFERENCE NUMERALS 11a, 11b . . . IMAGE PROCESSING DEVICE, 51 . . . TARGET SIGNAL PROCESSING UNIT, 52 . . . ESTIMATION UNIT, 53 . . . CORRECTION PROCESSING UNIT, 54 . . . MONITOR, 55 . . . AMPLIFICATION UNIT, 101 . . . PROPAGATION PATH TEST UNIT, 102 . . . SCATTERING CHARACTERISTIC ESTIMATION UNIT, 121 . . . LASER LIGHT UNIT, 122 . . . LASER LIGHT RECEPTION UNIT, 201 . . . LIGHT SOURCE UNIT, 202 . . . OPTICAL DEMULTIPLEXING UNIT, 203 . . . RECEPTION UNIT, 221 . . . LIGHT DETECTION UNIT, 222 . . . LIGHT RECEPTION ELEMENT UNIT, 223 . . . CORRELATION FUNCTION CALCULATION UNIT, 301 . . . *CONDENSING UNIT, 302 . . . OPTICAL AMPLIFIER

The invention claimed is:

1. An image processing device comprising:
a correlation function calculation unit that calculates a cross-correlation function between reflected light from a target by signal light divided from a light source, and reference light that is divided from the light source, the cross-correlation function being an image output in ghost imaging;
a propagation path characteristic estimation unit that estimates a correlation function type point spread function due to scattering in propagation paths of the signal light and the reflected light; and
a correction unit that executes inverse function processing with respect to the cross-correlation function calculated by the correlation function calculation unit on the basis of the correlation function type point spread function estimated by the propagation path characteristic estimation unit.

2. The image processing device according to claim 1, wherein the propagation path characteristic estimation unit includes,
a laser light transmission unit that transmits laser light to the target,
a laser light reception unit that receives laser light reflected from the target, and
a scattering characteristic estimation unit that estimates the correlation function type point spread function on the basis of the laser light transmitted from the laser light transmission unit and the laser light that is received by the laser light reception unit.

3. The image processing device according to claim 1, wherein the propagation path characteristic estimation unit estimates the correlation function type point spread function by using a predetermined scattering model based on a plurality of pieces of data obtained in advance with respect to the correlation function type point spread function of the propagation paths.

4. The image processing device according to claim 1, further comprising:

an amplification unit that amplifies the reflected light from the target by the signal light, wherein the correlation function calculation unit calculates the cross-correlation function between the reflected light amplified by the amplification unit and the reference light.

5. An image processing method that is executed by an image processing device, comprising:

a correlation function calculation step of calculating a cross-correlation function between reflected light from a target by signal light divided from a light source, and reference light that is divided from the light source, the cross-correlation function being an image output in ghost imaging;

a propagation path characteristic estimation step of estimating a correlation function type point spread function of propagation paths of the signal light and the reflected light; and a correction step of executing inverse function processing with respect to the cross-correlation function calculated by processing in the correlation function calculation step on the basis of the correlation function type point spread function estimated by processing in the propagation path characteristic estimation step.

6. A non-transitory computer-readable storing medium that stores a program causing a computer to execute a control process including:

a correlation function calculation step of calculating a cross-correlation function between reflected light from a target by signal light divided from a light source, and reference light that is divided from the light source, the cross-correlation function being an image output in ghost imaging;

a propagation path characteristic estimation step of estimating a correlation function type point spread function of propagation paths of the signal light and the reflected light; and a correction step of executing inverse function processing with respect to the cross-correlation function calculated by processing in the correlation function calculation step on the basis of the correlation function type point spread function estimated by processing in the propagation path characteristic estimation step.

* * * * *